US005569888A

United States Patent [19]
Kamani et al.

[11] Patent Number: 5,569,888
[45] Date of Patent: Oct. 29, 1996

[54] ULTRASONIC ELEVATOR DOOR SAFETY SYSTEM

[75] Inventors: Sanjay Kamani, Unionville; John K. Salmon, South Windsor, both of Conn.

[73] Assignee: Otis Elevator Company, Farmington, Conn.

[21] Appl. No.: 249,313

[22] Filed: May 26, 1994

[51] Int. Cl.$^6$ .............................. B66B 13/24; B66B 13/26
[52] U.S. Cl. ............................................ 187/317; 187/392
[58] Field of Search ..................................... 187/316, 317, 187/392; 49/120, 118, 117

[56] References Cited

U.S. PATENT DOCUMENTS

| | | | |
|---|---|---|---|
| Re. 30,719 | 8/1981 | Mills | 187/52 R |
| 3,367,450 | 2/1968 | Leater et al. | 187/317 |
| 4,537,287 | 8/1985 | Noda et al. | 187/29 R |
| 4,706,227 | 11/1987 | DuVall et al. | 367/96 |
| 4,910,464 | 3/1990 | Trett et al. | 328/5 |
| 5,235,144 | 8/1993 | Matsui et al. | 187/112 |
| 5,329,075 | 7/1994 | Hirabayashi et al. | 187/104 |
| 5,447,211 | 9/1995 | Sors | 187/277 |

Primary Examiner—Robert Nappi

[57] ABSTRACT

Ultrasonic waves may be emitted from a transmitter/receiver sonic transducer, or separate transmitter working with a separate receiver, directly or reflected into the opening between doors of an elevator; responses reflected from objects or passengers between the doors which are received within a window of response are utilized to create a door reversal signal. The ultrasonic waves may be shaped into a curtain or sheet by means of a hyperbolic reflector opening downwardly toward the doors. To equalize time of travel for sound waves emanating from a single source on one side to all parts of the door opening, the reflector may also have a parabolic shape. The sound waves may be emitted in a cylindrical pattern to accommodate elevators having circular doors. Multiple reflectors may include a convex reflector to spread the sound waves vertically.

15 Claims, 3 Drawing Sheets

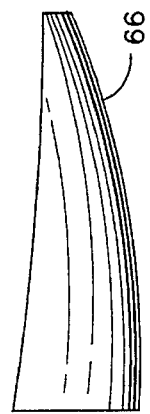
FIG.8
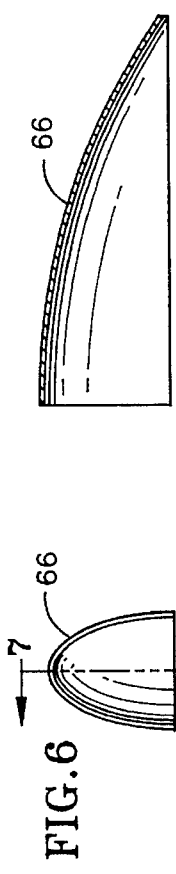
FIG.7
FIG.6
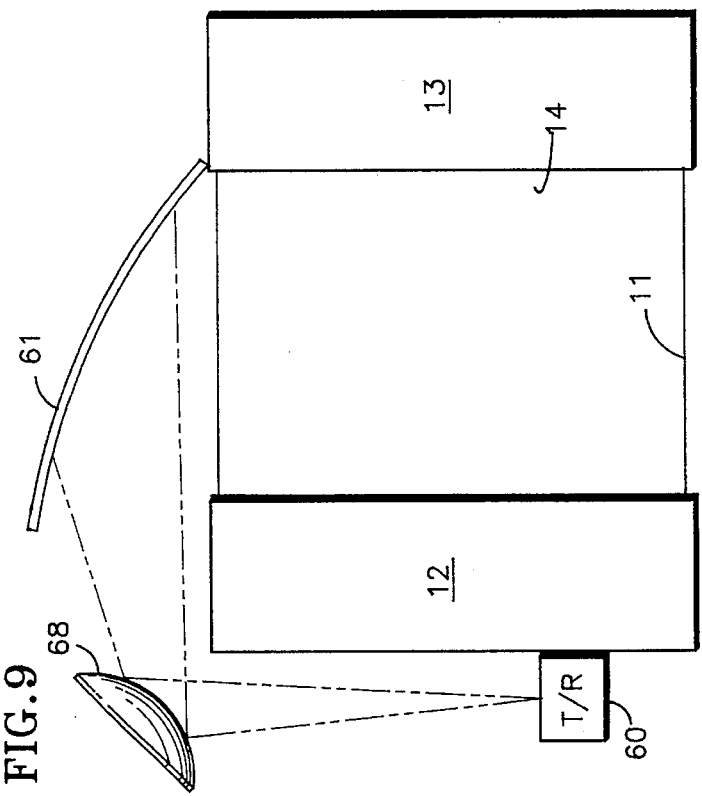
FIG.9
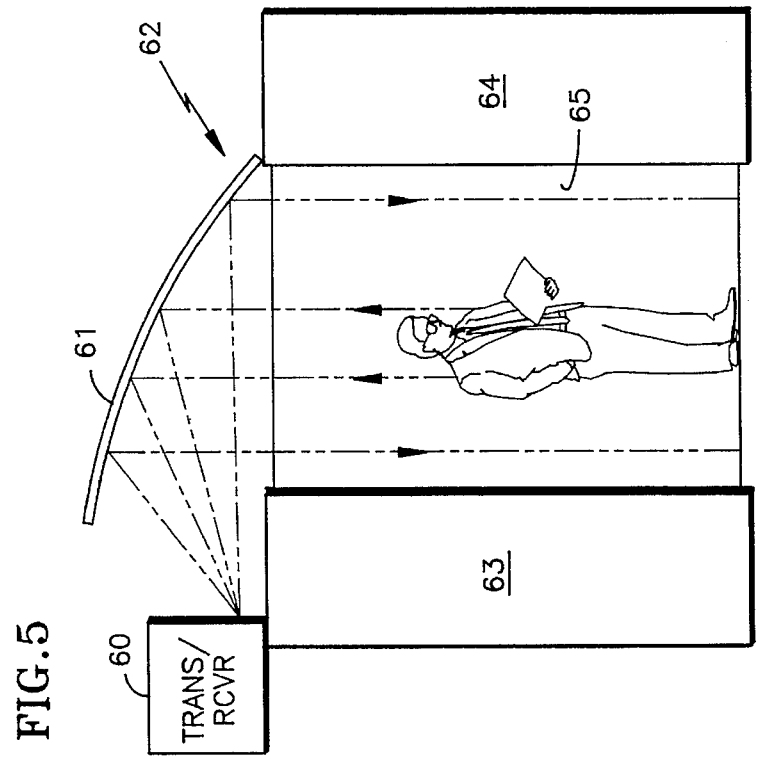
FIG.5

ULTRASONIC ELEVATOR DOOR SAFETY SYSTEM

TECHNICAL FIELD

This invention relates to using ultrasonic waves to sense the presence of objects in the path of elevator doors.

BACKGROUND ART

In typical elevator systems known to the prior art, one type of elevator safety shoe comprises a mechanical arm that moves on a pivot in response to mechanical force imparted to it as a consequence of the door closing against an object, or due to a passenger hitting the shoe. The typical safety shoe is prone to excessive wear and frequent maladjustment due to the mechanical shock required to operate it. This disadvantage is overcome in optical elevator door safety systems which have a plurality of light beams transmitted across the door opening. In such a system, the only force imparted to the door is the deceleration/acceleration force to reverse door direction. Typically, the transmitters and receivers of optical safety systems are physically attached to the elevator doors, and therefore are subject to vibrations from door operation. Another problem with optical systems is that horizontal, line of sight light beams cannot be used in round elevator door systems. Vertical light beams are not used because having either the transmitter or the receiver mounted in the floor area would subject the system to extremely high wear, dirt and the like. Both systems are subject to vandalism simply because the operative parts are in the vicinity of the head and arms of the passengers.

DISCLOSURE OF INVENTION

Objects of the present invention include provision of an elevator door safety system which is not subject to wear and tear, which will not fall out of adjustment, which is not prone to vandalism and which can be used on circular elevator doors. Other objects include provision of an elevator door safety system which is of relatively low cost, has few parts and is very adaptable to a wide variety of elevator door systems.

According to the present invention, sound waves are emitted into the area between opening elevator doors, and return waves received from reflections within a window of response provide a signal indication of an object or passenger being within the path of the door, which can be used for a door reversal signal. According to the invention further, the pattern of emitted and received sound waves may be confined to a curtain or sheet pattern by means of a hyperbolic reflector; the reflector may also be parabolic in the between-door dimension so as to provide uniformity of distance across the entire curtain or sheet to simplify control over the sensitivity window. According further to the invention, the sound waves may be emitted from one transducer and return waves received at another, or, the same transducer may be used for both. In still further accord with the invention, timing for the window of sensitivity may be effected by means of dedicated hardware or by means of simple software routines which may be implemented in computers otherwise utilized to control the doors and/or other elevator car functions.

Other objects, features and advantages of the present invention will become more apparent in the light of the following detailed description of exemplary embodiments thereof, as illustrated in the accompanying drawing.

BRIEF DESCRIPTION OF THE DRAWINGS

FIG. 5 is a simplified diagram of another embodiment of the present invention.

FIG. 6 is a side elevation view of a sonic reflector which may be used in the embodiments of FIGS. 4 and 5.

FIG. 7 is a section side elevation view taken on the line 7—7 of FIG. 6.

FIG. 8 is a top plan view of the sonic reflector illustrated in FIGS. 6 and 7.

FIG. 9 is a simplified diagram of another embodiment of the present invention.

BEST MODE FOR CARRYING OUT THE INVENTION

Figure 1:
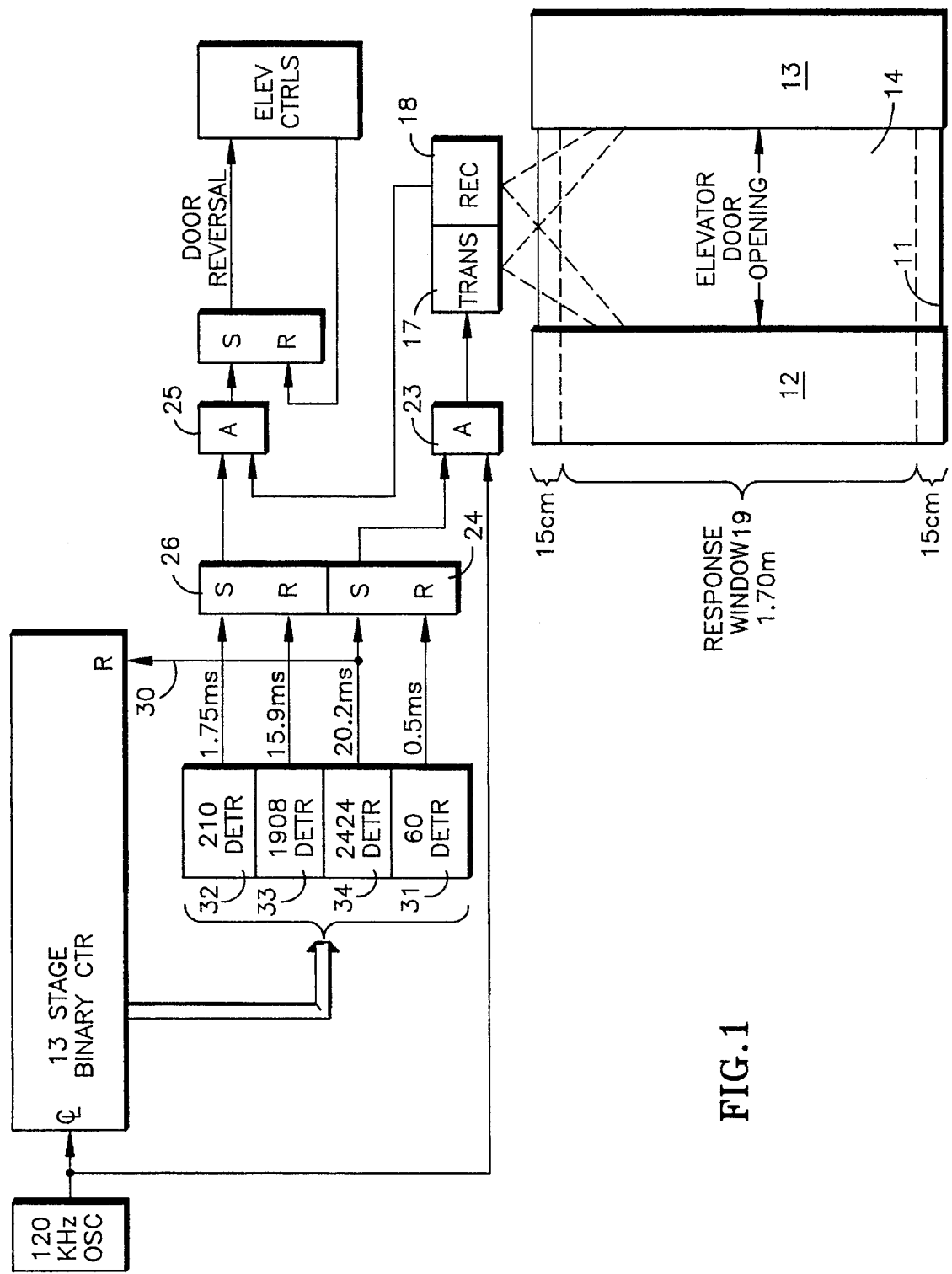
FIG. 1 is a simplified schematic block diagram of a simple embodiment of the present invention.

Referring now to FIG. 1, an elevator 11 has a pair of doors 12, 13 which are shown in an open position, the opening 14 between which must be monitored to determine whether there are objects or passengers in the path of the doors 12, 13 (the space between the doors through which the doors move as they open and close) so as to not injure passengers, objects or doors in normal operation. According to the invention, a sonic transmitter 17 emits sound waves from a point above the opening 14 downwardly and any reflections from generally horizontal surfaces will be received by a sonic receiver 18 which is similarly disposed above the elevator door opening 14. To avoid sensing the tops of the elevator doors 12, 13 and the floor of the elevator 11, the system is only responsive to return waves which have a timing with respect to the transmitted wave indicative of being within a response window 19. In this example, it is assumed that the elevator door opening is two meters high, and a dead band of 15 centimeters is provided at the top and the bottom of the elevator door opening 14. In one example, the sound waves are emitted at 120 Kilohertz, in response to an oscillator 22. While the oscillator 22 runs continuously, an AND gate 23 controls the duration of the pulse from the transmitter 17, whereby the system can listen for echoes after each transmitted pulse. The AND gate 23 is controlled by a bistable device 24 which in turn is set and reset in response to signals indicating times related to the initiation and termination of each pulse. The receiver will respond to any echoes, but an AND gate 25 will cause the system to respond only to reflections which occur within the response window 19. The AND gate 25 is in turn controlled by a bistable device 26 which is set at a point in time relative to the transmitted pulse which is timed to be the beginning of the response window for the leading edge of the transmitted pulse and which is reset at a time corresponding to the end of the response window for a reflection of the tail end of the transmitted pulse, all as is illustrated in the timing diagram of FIG. 2.

The timing and frequency of the sonic wave are selected to accommodate the 15 centimeter dead zone at the top and bottom of the elevator door opening 14. The pulse must be of less spatial extent than this dead zone, and the pulse should have sufficient alternating content to facilitate reliable reflection tuning. For a pulse having a spatial extent of 12 centimeters, with the speed of sound being approximately 240 meters per second, the temporal width of the pulse would be about 0.5 milliseconds. To have 60 cycles in each pulse requires 120 Kilohertz. The time required for the leading edge of the pulse to reach the beginning of the response window (that is, to traverse the 15 centimeter dead zone) is 0.625 milliseconds. Similarly, any return wave from exactly the interface of the dead zone will take 0.625 milliseconds to traverse the distance between the edge of the response window to the receiver 12. On the other hand, the trailing edge of the transmitted wave will take one-half millisecond longer to reach the beginning of the response window 19, which is 1.125 milliseconds. Thus, the total time, for the trailing edge of the pulse to reach the beginning of the response window 19 and a wave reflected therefrom to return to the receiver, is 1.75 milliseconds. Thus, the beginning of the response window is taken to be 1.75 milliseconds from the start of the pulse. For the leading edge of the pulse to reach the bottom of the response window (a distance of 1.85 meters) requires 7.708 milliseconds; the trailing edge takes another half millisecond, which is 8.208 milliseconds. Any reflection requires 7.708 milliseconds so that the total time from the beginning of the transmitted pulse to the last time when a reflection at the lower edge of the response window 19 could reach the receiver 18, if reflected from the trailing edge of the pulse, requires 15.916 milliseconds.

In FIG. 1, the oscillator 22 feeds the 120 Kilohertz signal to a 13 stage binary counter 29. At 120 Kilohertz, each count of the counter 29 is 8.3 microseconds. Decoding the counts within the counter therefore provides indications of the time. The counter is reset (reestablished at a zero count) by the same signal on a line 30 that sets the bistable device 24 to enable transmitting the pulse into the elevator door opening. Therefore, the counts are indicative of time elapsed since the start of the transmitted pulse.

Figure 2:
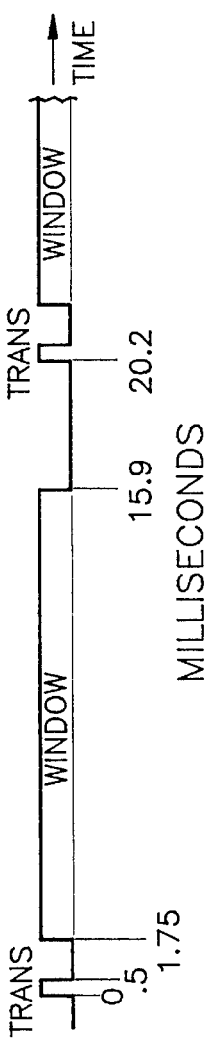
FIG. 2 is a time diagram illustrating the embodiment of FIG. 1.

A first detector 31 detects a count of 60 which indicates an elapsed time of 0.5 milliseconds from the start of the pulse. This provides the signal to reset the bistable device 24 so that the gate 23 is no longer enabled, thereby terminating the transmitted pulse, as seen in FIG. 2. Next, a detector 32, which sets the bistable device 26, detects a count of 210, 1.75 milliseconds after the start of the transmitted pulse (FIG. 2), thereby enabling the AND gate 25 to be responsive to the upper edge of the response window. A detector 33 detects a count of 1908 and resets the bistable device 26, thereby rendering the AND gate no longer responsive to the receiver 18 at the far end of the response window, 15.9 milliseconds after the start of the pulse (FIG. 2). Finally, a detector 34 detects a count of 2424 which provides a signal on the line 30 to again reset the counter and to set the bistable 24 so the AND gate 23 will again pass 120 Kilohertz signals through to the transmitter 17. The result is that there is a new cycle every 20.2 milliseconds (FIG. 2). The detectors 31–34 may simply be an array of gates so as to sense stages that are on and stages that are off. For instance, the gate 31 responds to the third through seventh stages from lowest order being on and the remaining stages being off, so as to detect a count of 60. The detector 32 responds to the second, fifth, seventh and eighth stages being on and the remainder being off, to achieve a count of 210. The detector 33 responds to the third through seventh and ninth through eleventh stages being on and the remainder being off, to sense a count of 1908, and the detector 34 responds to all of the fourth through seventh, ninth and twelfth stages being on and the rest off, to sense a count of 2424. Note that when the doors are closed, the reflections therefrom are above the window.

The exact timing of the response window and the choice of frequency, as well as the details of implementing apparatus which will provide for the emission of ultrasonic waves into the elevator door opening and respond only to echoes received within the opening itself, as described, of which FIG. 1 is merely an example, can be varied to suit any particular implementation of the present invention. Instead of using a dedicated counter 29 and the detectors 31–34, the window may be created in a simple fashion by means of a door reversal routine illustrated in FIG. 3. This may be performed in any micro or other computer which is utilized to provide control to the elevator, such as an elevator door control computer or an elevator car computer.

Figure 3:
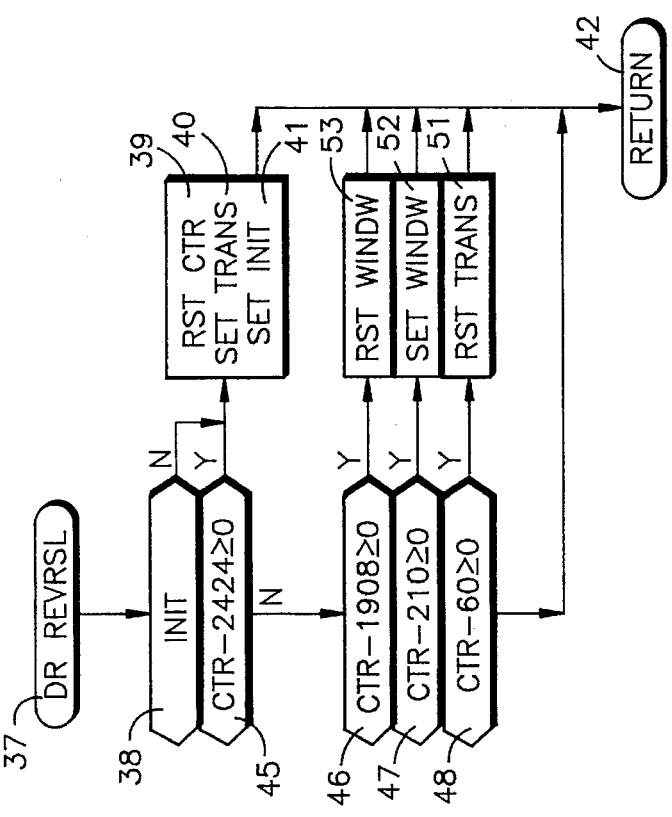
FIG. 3 is a logic flow chart of a simple door reversal routine which may be used in place of much of the hardware of FIG. 1.

In FIG. 3, the door reversal routine is reached through an entry point 37 and a first test 38 determines if initiation has occurred as yet, or not. Initially, it will not have, so a negative result of test 38 will reach a step 39 which will reset the counter (a counter function implemented in the microcomputer) a step 40 which sets the transmitter, to enable the pulse to begin, and a step 41 which sets an initiation flag so that the next pass through the subroutine need not necessarily pass through these steps. Then other parts of the program are reverted to through a return point 42. At some point later in time, the door reversal routine is again reached through the entry point 37 and this time the test 38 is affirmative reaching a test 45 to determine if the counter has reached a count of 2424, or not. Initially, it will not have, so a test 46 is reached to determine if a count has reached 1908, or not. Initially, this test is negative reaching a test 47 to determine if the count has reached 210. At first it will not, so a negative result of test 47 reaches a test 48 to see if the count has reached 60, or not. In the first few passes, test 48 will be negative so that other parts of the program are reverted to through the return point 42. Eventually, the count will reach 60 so an affirmative result of the test 48 will reach a step 51 which resets the transmitter, thus ending the transmitted pulse. In subsequent passes through the routine of FIG. 3, test 38 will be affirmative, tests 45–47 will be negative, and test 48 will be affirmative and will continue to reset the transmitter (equivalent to resetting the bistable 24) redundantly, in a manner that does no harm. At some point in time, the count will have reached 210 so that an affirmative result of test 47 will reach a step 52 to set the window (equivalent to setting the bistable 26 in FIG. 1). Thereafter, in each pass through the routine of FIG. 3, this will be repeated, redundantly, but harmlessly. In a similar fashion when the count reaches 1908, an affirmative result of test 46 will reach a step 53 to reset the window (equivalent to resetting the bistable 26 in FIG. 1). In subsequent passes through FIG. 3, an affirmative result of test 46 will redundantly but harmlessly cause step 53 to continuously reset the window. Eventually, the count in the counter will reach 2424 so an affirmative result of test 45 will reach the step 39 to again reset the counter, the step 40 to set the transmitter, and the step 41 to redundantly set the initiation (which normally has to be set only once each time that the computer is powered up). Thus, an affirmative result of test 45 starts a new cycle.

In FIG. 3, the tests 45–48 are identified with individual counts which relate to the 60 cycles of 120 Kilohertz and the particular window described with respect to FIG. 1 hereinbefore. One of the advantages of the present invention is that it is extremely versatile. Obviously, the tests 45–48 can be made against values set in registers, which values can be changed as desired so as to alter the manner in which the system will operate, particularly allowing the tailoring of the window and the overall cycle time for any desired installation. In any event, the counts referred to in tests 45–48, as well as in the detectors 31–34 are exemplary, simply to present an illustration of the invention.

Figure 4:
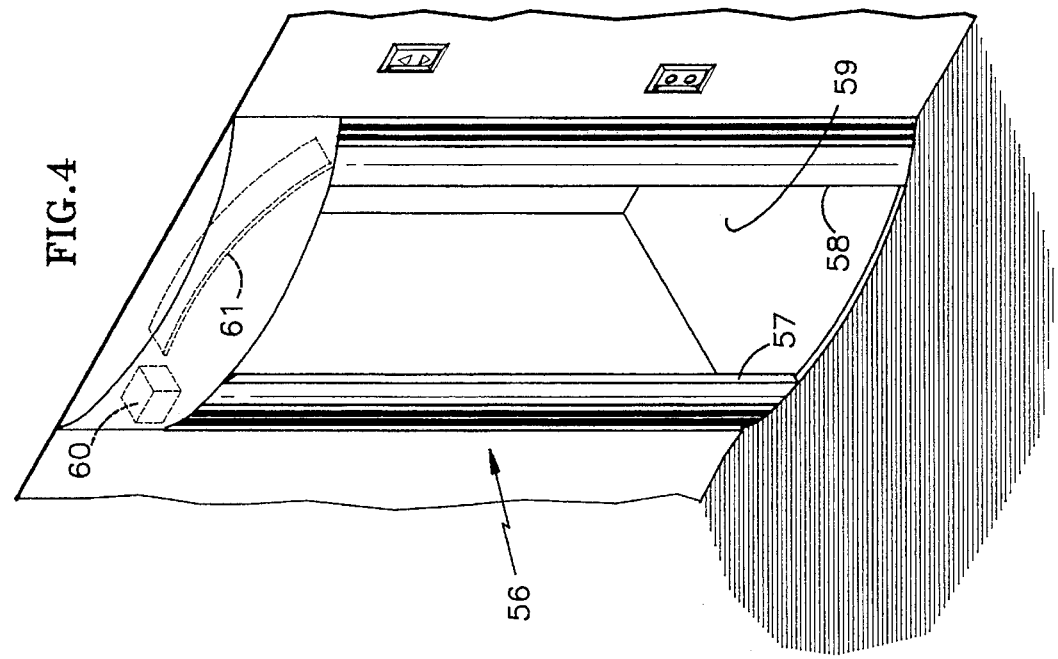
FIG. 4 is a simple perspective view of a circular elevator door system with which the present invention may be used.

Referring now to FIG. 4, another advantage of the present invention is that it is easily used with an elevator 56 which has circular doors 57, 58, which may be as described in a commonly owned copending U.S. patent application entitled "Elevator Door System", Ser. No. 08/146,667, filed Nov. 1, 1993. Above an opening 59 between the doors 57, 58 is a sonic transceiver (transmitter/receiver) 60 and a reflector 61. As illustrated in a simplified schematic form in FIG. 5, the transceiver 60 emits sonic waves horizontally, and these waves are reflected in a vertical direction by a reflector 61, which is shown only simplistically in FIG. 5. In FIG. 5, the elevator 62 has doors 63, 64 which may be either straight or curved, the reflector 61 being able to serve in either case. Because of the nature of sound waves (not very directional) and because of the nature of the opening, such as the opening 59 in FIG. 4 of an elevator 56 with circular doors 57, 58, sound waves may be used in accordance with the invention in a generally non-directed fashion by virtue of a flat reflector 61. On the other hand, if desired, the sound waves may be reflected into a reflector 61 which has a flat cross section (in and out of the page as seen in FIG. 5) but which, longitudinally, has a parabolic shape (as seen in FIG. 5) so as to cause the distance of transmission and reception from and to the transceiver 60 to be the same at the near side of the elevator door opening 65 as at the far side thereof. On the other hand, in order to avoid inadvertent triggering of the door reversal system, such as may occur from the inside of a very crowded elevator, it may be desirable to provide the sonic response in the form of a curtain or sheet, which would have a very narrow expanse front to back (as seen in FIG. 5). This may be achieved by utilizing a reflector 66 (FIG. 6) which has a hyperbolic camber as viewed from the transceiver 60, and as seen in FIG. 6. Just as is true in the case of optical waves upon a hyperbolic reflector, all of the waves become parallel (and thus vertical) in a system such as FIG. 5 with the reflector 66 of FIG. 6. The reflector of FIG. 6, if longitudinally hyperbolic, will be as shown in FIG. 7. The reflector of FIGS. 6 and 7 is assumed to have a generally circular axis in a horizontal plane, as is illustrated in FIG. 8. This facilitates its use with the circular door of FIG. 4.

In FIG. 5, the included angle of sonic transmission from the transceiver 60 in order to fill the opening 65 between the doors, is about 40°. One type of transducer has a conical transmit/receive pattern with an included angle of about 7°. If such a device is used in an embodiment as illustrated in FIG. 5, five or six such devices might be employed, or the transceiver 60 could be moved to the left as seen in FIG. 5 so as to allow use of a lesser angle. On the other hand, a single device with a 7° conical pattern might be utilized with a convex reflector 68 as is illustrated in FIG. 9 so as to create a virtual image sufficiently distant from the reflector 61 so as to fill the reflector 61 with a 7° cone. The reflector 68 is preferably cylindrical (rather than spherical) so as to spread the beam vertically while retaining the 7° angle horizontally.

Instead of using a reflector 66 (FIG. 8) having a generally circular axis, a plurality of transceivers may be disposed along the circle of the elevator door path, each transceiver having a hyperbolic shape so as to create a sheet of sound shaped like the surface of a right cylindrical polygon. Similarly, other combinations of transceivers and reflectors may be selected to suit any desired use of the present invention. However, for a simple system of gating as shown, a horizontal wave front in the doorway is preferred, to cause the response window to have the same timing across the entire doorway. Although two-door systems are used for example herein, the term "doors" includes a single door herein. The invention may be used with doors of curvilinear cross section other than a circle, and doors of other shapes, such as polygonal. Reflectors may be made of metal, but hard plastic is preferred. The transceiver herein may be a transmitter and separate receiver as shown in FIG. 1, a transmitter/receiver as shown in FIG. 5, or multiple transmitters, receivers or transmitter/receivers, with or without one or more reflectors.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

We claim:

1. An elevator door safety system for detecting objects and/or passengers in a door opening space through which said doors pass as they open and close, comprising:

a transceiver including a reflector having hyperbolic camber with an elongated focal line above said space for transmitting ultrasonic waves into said space and for receiving ultrasonic waves reflected back to said transceiver from within said space; and means for generating a door reversal signal in response to ultrasonic waves received at said transceiver within a predetermined range of time from the initiation of transmission of said ultrasonic waves.

2. An elevator door safety system according to claim 1 wherein said transceiver transmits an ultrasonic pulse into said space.

3. An elevator door safety system according to claim 2 wherein said pulse is of about 0.5 milliseconds duration.

4. An elevator door safety system according to claim 1 wherein said reflector is mounted above said space and said predetermined range of time is selected to exclude reflections from the top of the doors and from the floor of the elevator.

5. An elevator door safety system for detecting objects and/or passengers in a planar door opening space through which said doors pass as they open and close, comprising:

a transceiver including a reflector having hyperbolic camber with a parabolic focal line in the same plane as and above said space for transmitting ultrasonic waves into said space and for receiving ultrasonic waves reflected back to said transceiver from within said space; and means for generating a door reversal signal in response to ultrasonic waves received at said transceiver within a predetermined range of time from the initiation of transmission of said ultrasonic waves.

6. An elevator door safety system for detecting objects and/or passengers in the door opening space through which said doors pass as they open and close, wherein said space has a curvilinear horizontal cross section, comprising:

a transceiver including a reflector having a hyperbolic camber and a curvilinear focal line in an extension of and above said space for transmitting ultrasonic waves into said space and for receiving ultrasonic waves reflected back to said transceiver from within said space; and means for generating a door reversal signal in response to ultrasonic waves received at said transceiver within a predetermined range of time from the initiation of transmission of said ultrasonic waves.

7. An elevator door safety system according to claim 6 wherein said space is in the shape of a portion of the curved surface of a right cylinder and said transceiver includes a reflector having a hyperbolic camber and a circular focal line in an extension of and above said space.

8. An elevator door safety system for detecting objects and/or passengers in the door opening space through which said doors pass as they open and close, wherein said space has a curvilinear horizontal cross section, comprising:

a transceiver including a reflector having a hyperbolic camber and a focal line which is horizontally curvilinear and vertically parabolic in an extension of and above said space for transmitting ultrasonic waves into said space and for receiving ultrasonic waves reflected back to said transceiver from within said space; and means for generating a door reversal signal in response to ultrasonic waves received at said transceiver within a predetermined range of time from the initiation of transmission of said ultrasonic waves.

9. An elevator door safety system according to claim 8 wherein said space is in the shape of a portion of the curved surface of a right cylinder and said transceiver includes a reflector having a hyperbolic camber and a focal line which is horizontally curvilinear and vertically parabolic in an extension of and above said space.

10. An elevator door safety system according to claim 1 wherein said transceiver comprises a transmitting transducer and a receiving transducer.

11. An elevator door safety system according to claim 1 wherein said transceiver comprises a transducer which both transmits and receives.

12. An elevator door safety system according to claim 11 wherein said transceiver consists of a single transducer which both transmits and receives.

13. An elevator door safety system according to claim 5 wherein said transceiver includes a plurality of reflectors.

14. An elevator door safety system according to claim 13 wherein said transceiver includes a plurality of reflectors in series with each other.

15. An elevator door safety system according to claim 13 wherein one of said reflectors has a convex cylindrical shape disposed to spread said sound waves vertically.

* * * * *